(12) United States Patent
Potoradi et al.

(10) Patent No.: US 6,943,467 B2
(45) Date of Patent: Sep. 13, 2005

(54) ELECTRIC MACHINE WITH HEAT PIPES

(75) Inventors: Detlef Potoradi, Bad Neustadt/Saale (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/738,249

(22) Filed: Dec. 16, 2003

(65) Prior Publication Data

US 2004/0155539 A1 Aug. 12, 2004

(30) Foreign Application Priority Data

Dec. 16, 2002 (DE) ......................................... 102 58 778

(51) Int. Cl.[7] .................................................. H02K 9/00
(52) U.S. Cl. ........................................... 310/52; 310/58
(58) Field of Search .............................. 310/52, 53, 54, 310/58, 61, 64, 57, 59, 60 A; 29/605

(56) References Cited

U.S. PATENT DOCUMENTS

| | | | |
|---|---|---|---|
| 1,700,840 A | 2/1929 | Gay | 310/52 |
| 3,801,843 A | * 4/1974 | Corman et al. | 310/52 |
| 4,921,041 A | * 5/1990 | Akachi | 165/104.29 |
| 5,140,204 A | 8/1992 | Cashmore et al. | |
| 6,105,662 A | 8/2000 | Suzuki | |
| 6,538,351 B2 | * 3/2003 | Semba et al. | 310/52 |

FOREIGN PATENT DOCUMENTS

| | | |
|---|---|---|
| DE | 2 330 172 | 1/1974 |
| DE | 28 10 222 | 9/1979 |
| EP | 0 079 985 A | 6/1983 |
| JP | 59 117456 A | 7/1984 |
| JP | 62 262633 A | 11/1987 |
| JP | 01 110033 A | 4/1989 |
| JP | 02 079747 A | 3/1990 |

OTHER PUBLICATIONS

W. Markert: "Einsatz von Wärmerohren zur Kühlung elektrischer Maschinen" in: Elektrie, Issue 36, vol. 1, 1982.
"Complete Catalogue Noren Heatpipes", Vienna, Austria, Status Nov. 15, 2001.

* cited by examiner

*Primary Examiner*—Darren Schuberg
*Assistant Examiner*—Leda Pham
(74) *Attorney, Agent, or Firm*—Henry M. Feiereisen

(57) ABSTRACT

An electric machine includes a stator and a rotor which is spaced from the stator at formation of an air gap therebetween. In order to cool down heat-generating components of the stator and the rotor, the electric machine is provided with a cooling system which includes heat pipes placed in proximity of the heat-generating components.

10 Claims, 4 Drawing Sheets

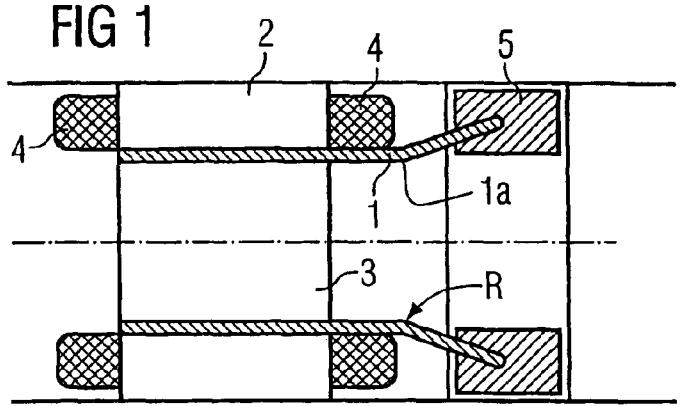
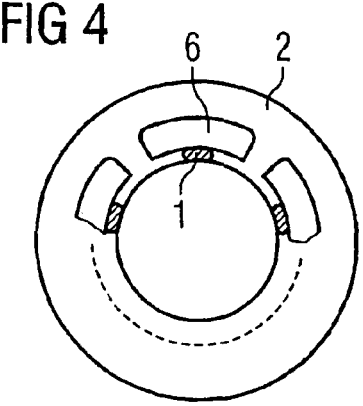
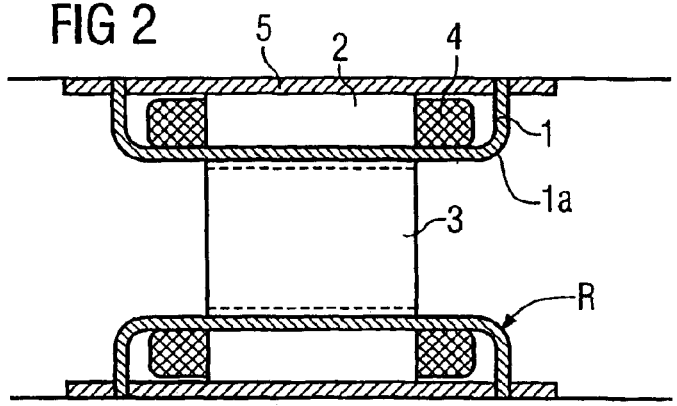
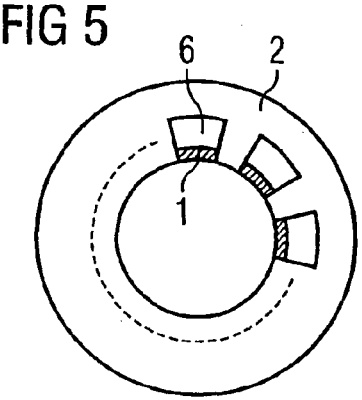
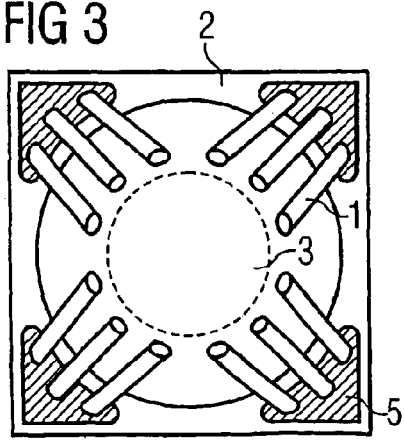
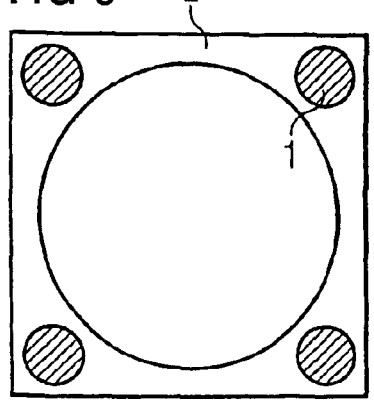

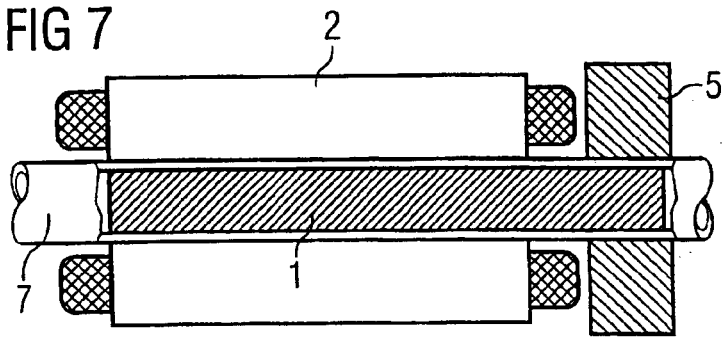
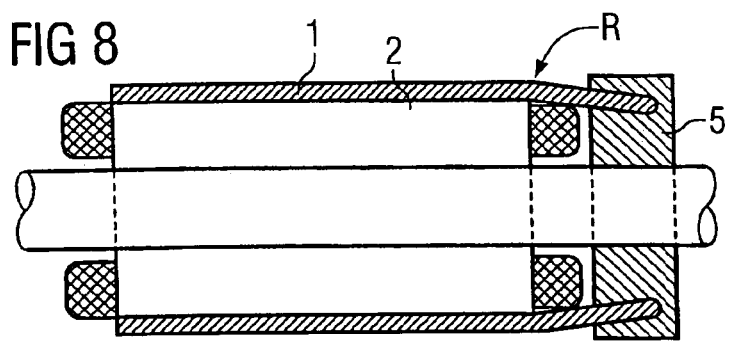
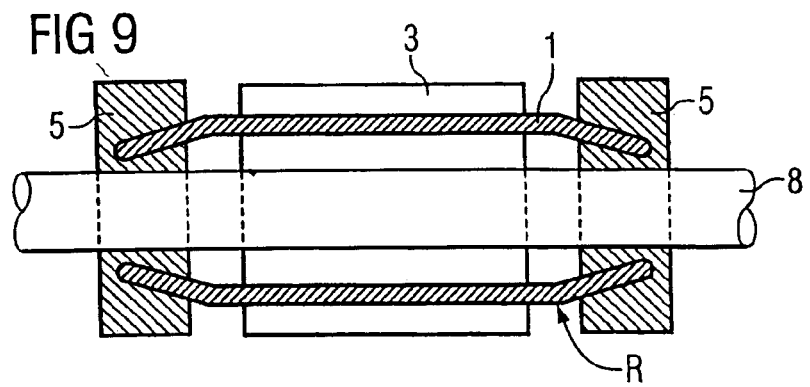
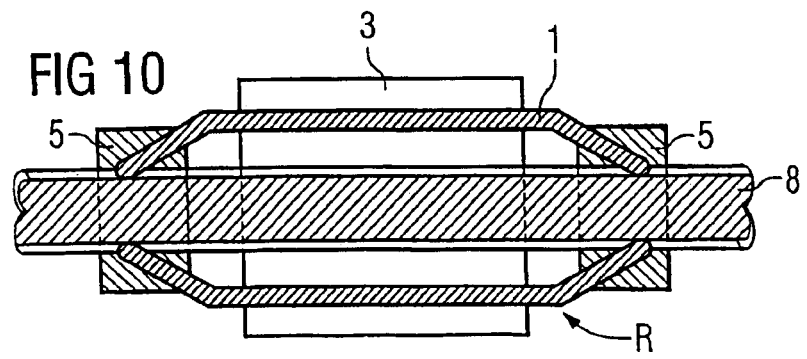

FIG 11

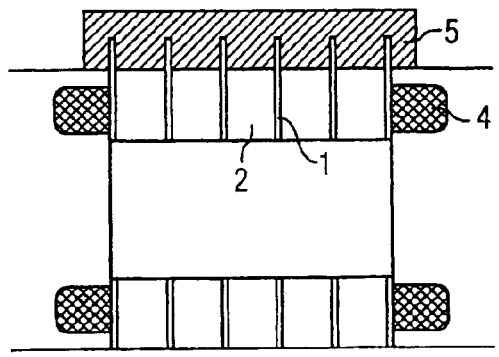

FIG 12

| Heat Pipe Arrangement | Cooler Arrangement |
|---|---|
| Stator | |
| >in slot opening<br>>as slot wedge<br>>in the winding/slot<br>>in the air gap winding<br>>in the active iron part<br>>in the corners of the active part<br>>in the air gap winding<br>>in the axle (external rotor)<br>>as intermediate plates in the active part<br>>as cooling jacket about the laminated stack | >axially separate<br>>axially in the bearing shield<br>>on the perimeter<br>>in the stator corners<br>>as attachment axial/radial |
| Rotor | |
| >on the rotor surface<br>>in the rotor<br>>in the shaft | >axially on the shaft on one side<br>>axially on the shaft on both sides<br>>in the shaft |
| Further Arrangement for Heat Pipe in the Electric Motor | |
| >as short-circuit bars in an asynchronous motor<br>>as slot insulation<br>>as coil shell<br>>as sleeve in the air gap between stator and rotor → as "bandage"<br>>as slot opening | |

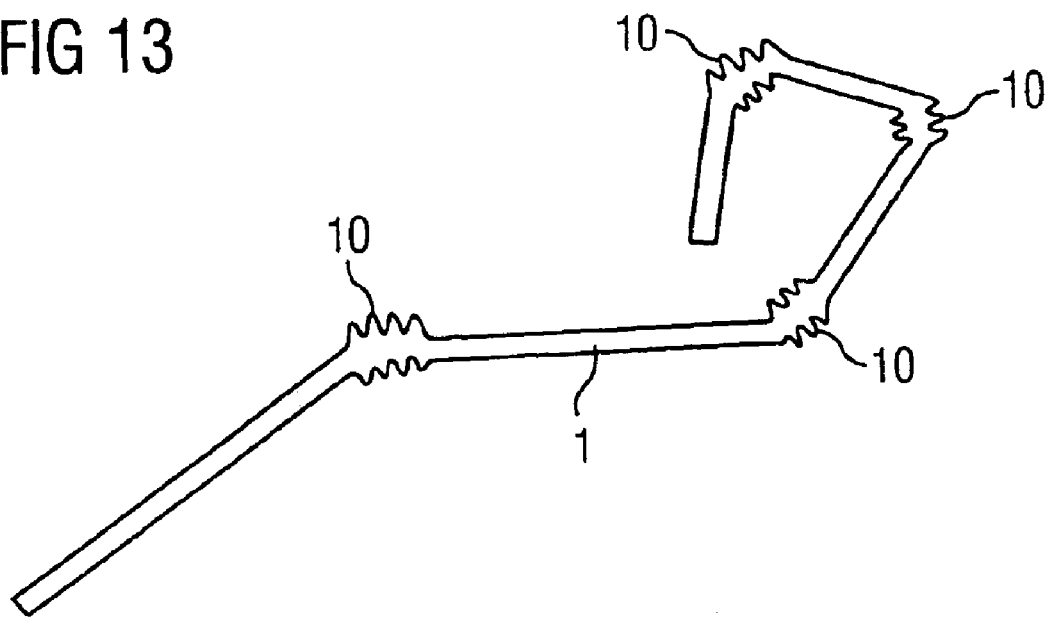

ELECTRIC MACHINE WITH HEAT PIPES

CROSS-REFERENCES TO RELATED APPLICATIONS

This application claims the priority of German Patent Application, Serial No. 102 58 778.7, filed Dec. 16, 2002, pursuant to 35 U.S.C. 119(a)–(d), the disclosure of which is incorporated herein by reference.

BACKGROUND OF THE INVENTION

The present invention relates, in general, to an electric machine with heat-generating sources.

During operation of an electric machine, both the stator and the rotor generate heat that must be carried off to the outside to maintain proper operation. Heat dissipation is normally realized through heat conduction via the yoke of the stator or through known air and liquid systems. In particular, when high-performance motors or compact structures are involved, these approaches proved insufficient. Therefore, liquid cooling systems have been proposed, which, however, are relative complicated and require supply lines and drain conduits that can be attached only at the side distal to the heat-generating components.

It would therefore be desirable and advantageous to provide an improved electric machine which obviates prior art shortcomings and which is simple in structure to realize an efficient and reliable cooling of heat-generating components.

SUMMARY OF THE INVENTION

According to one aspect of the present invention, an electric machine includes a stator, a rotor spaced from the stator, and a cooling system including a heat pipe for cooling a heat-generating component of the stator and the rotor.

The present invention resolves prior art problems by utilizing heat pipes which are commercially available and are formed as closed tubes which have a capillary layer along their inner wall and include a transport medium, such as a liquid working fluid, e.g. a refrigerant such as, for example, fluorocarbons, ammonia or water. One end of the heat pipes forms a heat or evaporation zone which is heated during operation to thereby evaporate the transport medium and thus turn it into vapor which then flows through the mid-section (transport zone) of the heat pipes to the other end which constitutes the cold or condenser zone. Condensed liquid is returned again through capillary pumping action in the capillary layer (e.g. a wick) to the evaporation zone.

Typically, the heat pipes have a standardized outer diameter of about 0.1 to 16 mm at a length of about 50 to 300 mm.

Suitably, the heat pipes are positioned in or near the heat-generating source of the electric machine. Examples of a heat-generating source includes, i.a., magnetic field conducting components, such as stator laminations and rotor laminations, current-carrying components, such as winding systems of stator and rotor, and necessary components for operation of the electric machine, such as bearings. In this way, heat can be dissipated already at the site where it is generated, without heating up further secondary parts. Suitably, the condenser zones of the heat pipes are connected with cooling masses or coolers which dissipate heat to the outside. Examples include fan-type coolers or separately cooled elements.

The use of heat pipes for cooling purposes has also the advantage that the electric machine can be cooled down sufficiently to ensure at the same time reliable magnetic properties.

According to another feature of the present invention, the heat pipe may be made flexible at least along a predetermined section. In this way, the heat pipe is able to conform to a shape of the heat-generating component.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a schematic partly sectional view of an electric machine equipped with axially extending heat pipes in accordance with the present invention;

FIG. 2 is a schematic partly sectional view of a variation of an electric machine equipped with axially extending heat pipes in accordance with the present invention;

FIG. 3 is a schematic partly sectional view of another variation of an electric machine equipped with radially extending heat pipes in accordance with the present invention;

FIG. 4 is a sectional view through the stator of the electric machine of FIG. 1 to depict the disposition of heat pipes in slots of the stator;

FIG. 5 is a sectional view through the stator of the electric machine of FIG. 2 to depict a variation of the disposition of heat pipes in slots of the stator;

FIG. 6 is a schematic partly sectional view of a square stator with embedded heat pipes in accordance with the present invention;

FIG. 7 is a schematic partly sectional view of an external rotor motor having incorporated therein a heat pipe in accordance with the present invention;

FIG. 8 is a schematic partly sectional view of a variation of an external rotor motor having incorporated therein heat pipes in accordance with the present invention;

FIG. 9 is a schematic partly sectional view of a rotor having incorporated therein heat pipes in accordance with the present invention;

FIG. 10 is a schematic partly sectional view of a variation of a rotor having incorporated therein heat pipes in accordance with the present invention;

FIG. 11 is a schematic partly sectional view of a stator with heat pipes as intermediate plates;

FIG. 12 is a table illustrating possible sites of installation for heat pipes and coolers; and FIG. 13 is a schematic illustration of another embodiment of a heat pipe according to the invention.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic partly sectional illustration of an electric machine having a stator 2 and a rotor 3, with the stator 2 being configured in the form of a stack of laminations with end faces supporting winding end portions 4 of a stator winding which is received in slots 6 (FIGS. 4, 5) of the stator 2. Received axially in the slots 6 are heat pipes 1 which contain a transport or working medium, e.g. a refrigerant, to flow in the heat pipes 1. Each heat pipe 1 includes an evaporation or heat zone in immediate proximity of the heat-generating component to turn the transport medium into vapor and is routed axially to the outside to terminate in a cooler 5, e.g., an air cooler or a water cooler, where the condenser or cold zone is formed to return the vapor to the liquid state via a wick (not shown). The wick is able to absorb the fluid and moves it by capillary pumping action in direction to the evaporation zone.

The cooler 5 is a device axially separate from the electric machine or may be situated in a bearing shield of the electric machine. The heat pipe 1 is formed in axial direction with a bend 1a immediately behind the winding end portion 4 to direct the heat pipe 1 outwards. In this way, the heat pipe 1 operates more efficiently and does not act against the force of gravity.

FIG. 2 shows a variation of the heat pipe 1 which extends axially through the stator laminations, whereby the heat pipes 1 are guided outwards on either side of the stator lamination behind the winding end portion 4 for connection to the cooler 5 which is positioned at the circumference of the electric machine. The bend 1a of the heat pipes 1 immediately behind the winding end portions 4 has a radius R which is significantly smaller than the radius R of the bend 1a of the heat pipe of FIG. 1. In this way, efficiency of the electric machine is enhanced as both winding end portions 4 on opposite end surfaces of the stator 2 are cooled.

FIG. 3 shows a cross section of another embodiment of an electric machine with radial disposition of the heat pipes 1 in the stator 2. The condenser zone of the heat pipes 1 is hereby located in the corners of the stator 2, where also the coolers 5 are situated.

FIGS. 4 and 5 show arrangements of the heat pipes 1 in the slots 6. The heat pipes 1 may be arranged in the slot opening of a half-closed slot 6 as well as form at least part of a slot seal. It is also conceivable to place in particular the heat pipes 1 in the windings within the main insulation.

FIG. 6 is a schematic illustration of an electric machine with rectangular or square stator 2 having axial heat pipes 1 placed primarily in the corners of the stator 2.

FIG. 7 is a schematic partly sectional view of an external rotor motor with a stator 2 mounted on an axle 7. The heat pipes 1 are arranged here in the axle 7 of the stator 2 to transport generated loss heat in axial direction in the direction of a cooler 5 positioned at an end face of the laminated stator 2.

FIG. 8 shows another variation of an external rotor motor in which the heat pipes 1 are disposed in slots that point to the air gap of the external rotor motor and are connected with their condenser zones to the cooler 5 at the end face of the stator 2.

FIG. 9 is a schematic sectional view of an electric motor, illustrating a cooling system for a rotor 3 which includes a stack of laminations and is mounted on a shaft 8. The cooling system includes heat pipes 1 which are incorporated in the stack of laminations of the rotor 3 and extend in axial direction. Positioned at opposite end faces of the rotor 3 are coolers 5 which conjointly rotate with the shaft 8 and provide the cooling in the condenser zone of the heat pipes 1.

FIG. 10 shows a variation in which the heat pipe 1 is arranged in the rotor 3, with the coolers 5 disposed in the shaft 8 of the rotor 3.

FIG. 11 shows another embodiment of an electric machine in which the stator 2 includes a stack of laminations and has intermediate plates in the form of heat pipes 1. Thus, the stator 2 is cooled down in radial direction so that the cooler 5 is placed on the radially outer perimeter. Again, as stated above, the cooler 5 may be an air cooler or a liquid cooler.

Of course, the heat pipes 1 may principally also be used as short-circuit bars in an asynchronous motor. They may also be used as slot insulation in a slot 6 of the rotor 3 as well as stator 2. The heat pipes 1 may also be configured as coil shells for wrapping a winding therearound. Another variation may involve a configuration of the heat pipe 1 as sleeve in the air gap between the stator 2 and the rotor 3, especially as bandage for securing permanent magnets.

FIG. 12 provides an overview, although not exhaustive, of the many possibilities of installation for the heat pipes 1 and the coolers 5.

Suitably, the heat pipe 1 in all embodiments should be constructed flexible. The term "flexible" is used here in a generic sense and relates to the option to manufacture the heat pipe 1 according to particular features, relating to radius, diameter, etc, for installation in a respective machine type, or may also relate to the property of the heat pipe 1 so that straight heat pipes 1 can be bent or shaped at any or predetermined location to conform to the configuration of the electric machine. Bending of predetermined areas can be realized when configuring the heat pipe 1 with bellows-type zones 10, as shown by way of example in FIG. 13.

The heat pipes 1 can be constructed in a wide variety of cross sections. Although flat heat pipes have a less efficient in comparison to cylindrical heat pipes as far a cooling action is concerned, they still exceed the cooling action of conventional cooling agents. Thus, heat pipes may also be attached onto surfaces of e.g. rotors 3.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. An electric machine, comprising:
  a stator;
  a rotor spaced from the stator; and
  a cooling system, including a heat pipe, for cooling a heat-generating component of at least one of the stator and the rotor, and a cooler positioned at an axial end of the heat pipe wherein the heat pipe is flexible at least along a predetermined section for outward or inward deflection in a direction of the cooler.

2. The electric machine of claim 1, wherein the heat-generating component of the stator and the rotor is a member selected from the group consisting of winding, lamination stack, and winding end portion.

3. The electric machine of claim 1, wherein the heat pipe has an evaporation zone, a transport zone and a condenser zone, with the evaporation zone positioned adjacent to the heat-generating component.

4. The electric machine of claim 1, wherein the heat pipe is outwardly bent behind a winding end portion.

5. The electric machine of claim 1, wherein the heat pipe is constructed to conform to a shape of the heat-generating component.

6. The electric machine of claim 1, wherein the cooling system includes a cooler positioned axially on the electric machine in an area of the condenser zone of the heat pipe.

7. The electric machine of claim 1, wherein the cooler is arranged radially on the electric machine.

8. The electric machine of claim 1, wherein the cooler is part of the electric machine.

9. The electric machine of claim 1, wherein the cooler is separate from the electric machine.

10. The electric machine of claim 1, wherein the heat pipe extends in or around a winding end portion.

* * * * *